US010268351B1

(12) United States Patent
Mirho et al.

(10) Patent No.: US 10,268,351 B1
(45) Date of Patent: Apr. 23, 2019

(54) SYSTEM AND METHOD FOR PARTITIONING GRAPHICAL LAYOUTS BETWEEN MACHINE DISPLAY AREAS

(71) Applicant: TurboPatent Inc., Seattle, WA (US)

(72) Inventors: Charles A Mirho, Lake Oswego, OR (US); Joe Fortunato, Renton, WA (US)

(73) Assignee: TURBOPATENT INC., Seattle, WA (US)

(*) Notice: Subject to any disclaimer, the term of this patent is extended or adjusted under 35 U.S.C. 154(b) by 57 days.

(21) Appl. No.: 15/413,313

(22) Filed: Jan. 23, 2017

Related U.S. Application Data

(60) Provisional application No. 62/281,623, filed on Jan. 21, 2016.

(51) Int. Cl.
G06F 3/0484 (2013.01)
G06F 3/0488 (2013.01)
G06F 17/22 (2006.01)
G06F 17/21 (2006.01)

(52) U.S. Cl.
CPC ...... *G06F 3/04845* (2013.01); *G06F 3/04886* (2013.01); *G06F 17/212* (2013.01); *G06F 17/2247* (2013.01)

(58) Field of Classification Search
CPC .................................................. G06F 3/04845
See application file for complete search history.

(56) References Cited

U.S. PATENT DOCUMENTS

| 9,300,554 | B1 * | 3/2016 | Kosai | H04L 43/08 |
| 2011/0271233 | A1 * | 11/2011 | Radakovitz | G06F 3/0481 715/834 |
| 2016/0307344 | A1 * | 10/2016 | Monnier | G06T 11/206 |
| 2017/0004638 | A1 * | 1/2017 | Csenteri | G06T 11/206 |

* cited by examiner

*Primary Examiner* — William Titcomb
(74) *Attorney, Agent, or Firm* — FSP LLC

(57) ABSTRACT

A process for partitioning graphical charts determines the location of the chart's constituent elements and measures the extent to which those elements are interconnected. The process creates additional charts of a determined size, determines which elements connected to each of the other elements and partitions the elements, creating individual trees of elements and placing them on the created charts with connectors between the trees.

27 Claims, 6 Drawing Sheets

SYSTEM AND METHOD FOR PARTITIONING GRAPHICAL LAYOUTS BETWEEN MACHINE DISPLAY AREAS

CROSS-REFERENCE TO RELATED APPLICATIONS

This application claims benefit under 35 U.S.C. 119 to U.S. application Ser. No. 62/281,623, filed on Jan. 21, 2016, and incorporated herein by reference in its entirety.

BACKGROUND

Graphical charts are commonly used to concisely communicate concepts of flow, organization and structure in a variety disparate fields, but current methods of creating and partitioning charts may be labor intensive for the user.

Creation of graphical charts within a constrained space has traditionally created numerous problems for the user. Once a graphical chart is created, if it needs to be broken up into smaller charts, that can create additional issues for the user. The configuring and formatting of a single chart may necessitate the manipulation and configuration of multiple user interfaces, in the instance where a user needs to partition the chart into smaller charts, the user must also keep track of scale and ensure proper connections are made between elements. The user will need to often simultaneously use multiple interfaces simultaneously, creating a drain on computing resources and screen space as well.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
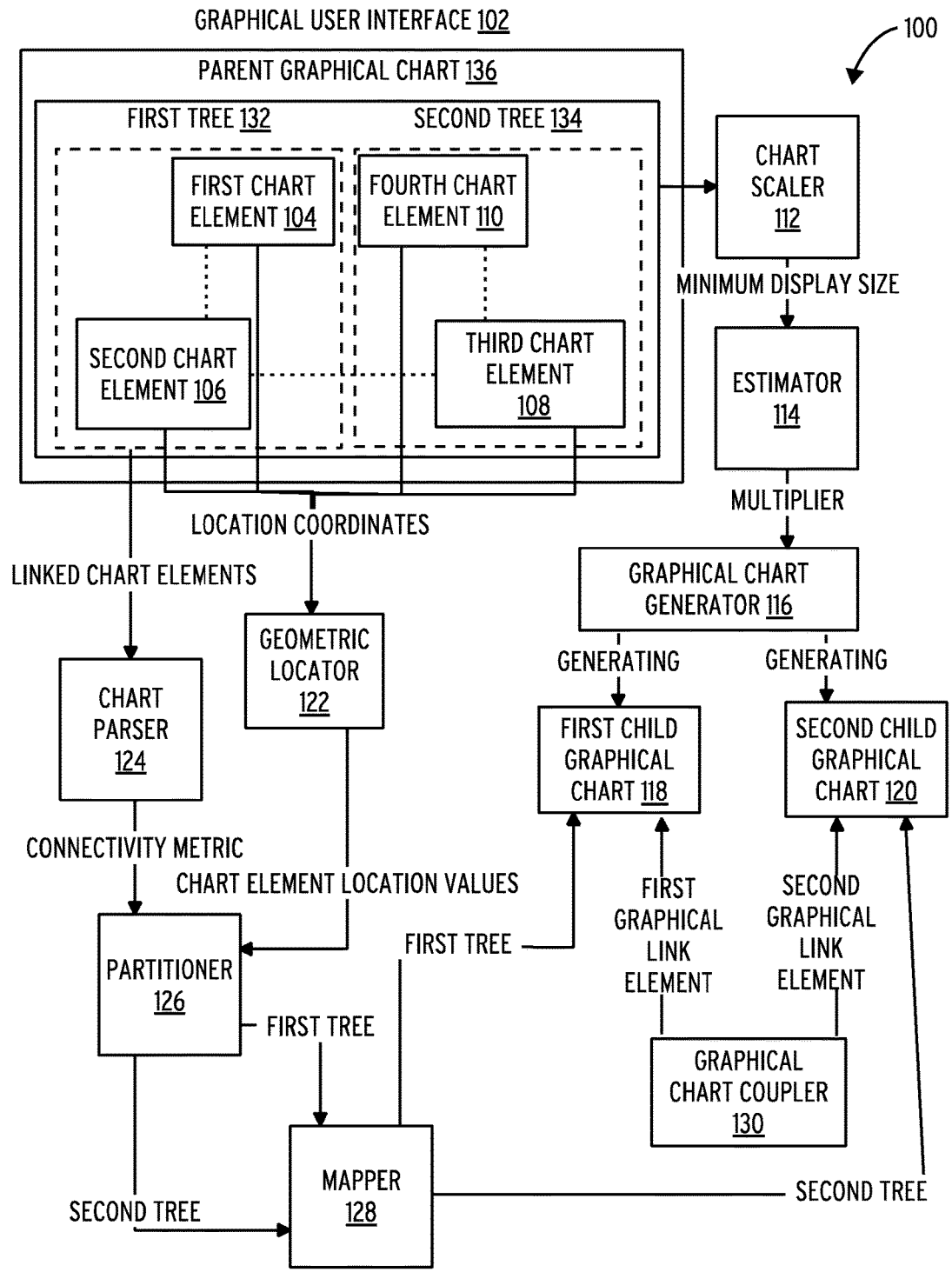
FIG. 1 illustrates an embodiment of a system for partitioning graphical charts 100.

"chart element" in this context refers to a component of a graphical chart, such as a step or node on a flowchart or structural chart "chart parser" in this context refers to logic to receive a a plurality of linked chart elements and generate a connectivity metric to determine the interconnectedness of the linked chart elements and to group the elements by number of links.

"chart scaler" in this context refers to logic to calculate a graphical chart size based on information such as the size, location and spacing of the chart elements "estimator" in this context refers to logic to estimate the number of graphical charts of a given size based on the constraining parameters such as size and number of elements contained in the chart.

"geometric locator" in this context refers to logic to determine the geometric location of an element within a multi-axis space "graphical chart" in this context refers to a graphical representation of interconnected chart elements, or a space which may contain interconnected chart elements, such as a tree.

"graphical chart coupler" in this context refers to logic to create an element to denote a linkage between graphical charts "graphical chart generator" in this context refers to logic to create a graphical chart from a given set of specifications such as dimensions and axes.

"mapper" in this context refers to logic to map a tree to a specified graphical chart based on the location, interconnectedness and connections of the constituent elements.

"partitioner" in this context refers to logic to separate chart elements into multiple trees based on the the element's location, connectivity metric and connections "Tree" in this context refers to a set of machine memory values interrelated to represent a hierarchical tree data structure. One example of a tree comprises a root value and subtrees of children, represented as a set of linked nodes. Nodes at higher levels of the hierarchy are referred to as "parents" of the nodes they link to in lower in lower levels of the hierarchy.

DESCRIPTION

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

"Associator" in this context refers to a correlator (see the definition for Correlator).

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Classifier" in this context refers to a specific type of correlator/associator logic that associates one or more inputs with a category, class, or other group sharing one or more common characteristics. An example of a classifier that may commonly be implemented in programmable hardware is a packet classifier used in network switches, firewalls, and routers (e.g., packet classifiers utilizing Ternary Content Addressable Memories). An example software or firmware classifier is: if (input1.value<12.5) input1.group=group1; else if (input1.value>=12.5 and input1.value<98.1) input1.group=group2; else input1.group=group3; Other examples of classifiers will be readily apparent to those of skill in the art, without undo experimentation.

"Combiner" in this context refers to a logic element that combines two or more inputs into fewer (often a single) output. Example hardware combiners are arithmetic units (adders, multipliers, etc.), time-division multiplexers, and analog or digital modulators (these may also be implemented is software or firmware). Another type of combiner builds an association table or structure (e.g., a data structure instance having members set to the input values) in memory for its inputs. For example: val1, val2, val3→combiner logic→{val1, val2, val3} set.val1=val1; set.val2=val2; set.val3=val3; Other examples of combiners will be evident to those of skill in the art without undo experimentation.

"Comparator" in this context refers to a logic element that compares two or more inputs to produce one or more outputs that reflects similarity or difference of the inputs. An example of a hardware comparator is an operational amplifier that outputs a signal indicating whether one input is greater, less than, or about equal to the other. An example software or firmware comparator is: if (input1==input2) output=val1; else if (input1>input2) output=val2; else output=val3; Many other examples of comparators will be evident to those of skill in the art, without undo experimentation.

"Correlator" in this context refers to a logic element that identifies a configured association between its inputs. One examples of a correlator is a lookup table (LUT) configured in software or firmware. Correlators may be implemented as relational databases. An example LUT correlator is: |low_alarm_condition|low_threshold_value|0||safe_condition|safe_lower_bound|safe_upper_bound||high_alarm_condition|high_threshold_value|0| Generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product-moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation.

"Firmware" in this context refers to software logic embodied as processor-executable instructions stored in read-only memories or media.

"Hardware" in this context refers to logic embodied as analog or digital circuitry.

"Incrementer" in this context refers to logic to advance (increase or decrease) a counting or index value by a fixed or predictably variable amount. Examples of hardware incrementers include adder arithmetic circuits and counter circuits. An example of a software incrementer is: x=x+incrementValue. Incrementers may be used as counters, or as logic to advance a referencial or associative index in a memory data structure.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Parser" in this context refers to logic that divides an amalgamated input sequence or structure into multiple individual elements. Example hardware parsers are packet header parsers in network routers and switches. An example software or firmware parser is: aFields=split("val1, val2, val3", ","); Another example of a software or firmware parser is: readFromSensor gpsCoordinate; x_pos=gpsCoordinate.x; y_pos=gpsCoordinate.y; z_pos=gpsCoordinate.z; Other examples of parsers will be readily apparent to those of skill in the art, without undo experimentation.

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Selector" in this context refers to a logic element that selects one of two or more inputs to its output as determined by one or more selection controls. Examples of hardware selectors are multiplexers and demultiplexers. An example software or firmware selector is: if (selection_control==true)

output=input1; else output=input2; Many other examples of selectors will be evident to those of skill in the art, without undo experimentation.

"Sequencer" in this context refers to logic to generate an ordered list of outputs from either an unordered or partially ordered set of inputs, or from a starting input and rules to generate next inputs. One attribute of a sequencer is that the outputs are done sequentially, meaning one after the other in time. An example of a hardware sequencer is a multiplexer with a counter driving its selection input. An example of a software or firmware sequencer is: out=val++; Other examples of hardware and software or firmware sequencers will now be readily apparent to those of skill in the relevant arts.

"Software" in this context refers to logic implemented as processor-executable instructions in a machine memory (e.g. read/write volatile or nonvolatile memory or media).

"Switch" in this context refers to logic to select one or more inputs to one or more outputs under control of one or more selection signals. Examples of hardware switches are mechanical electrical switches for switching power to circuits, devices (e.g., lighting), or motors. Other examples of hardware switches are solid-state switches such as transistors. An example of a hardware or firmware switch is: if (selection==true) output=input; else output=0; A somewhat more complicated software/firmware switch is: if (selection1==true and selection2==true) output=input1; else if (selection1==true and selection2==false) output=input2; else if (selection1==false and selection2==true) output=input3; else output=noOp; Switches operate similarly to selectors in many ways (see the definition of Selector), except in some cases switches may select all inputs to the output(s) not select among inputs. Other examples of switches will be readily apparent to those having skill in the art, without undo experimentation.

The system and method described provide capabilities to automatically create and partition multiple graphical charts from one chart. In one embodiment, the chart may read through the list of chart elements (here, chart) and for each element create a metric for determining the connectivity between the each chart element and the other chart elements. In one embodiment, the chart-parser may add all chart elements referencing this chart element (chartItem) to a list and denote which chart elements are connected to it or how many elements occur between this element and another element.

```
Chart-parser(chart){
foreach (chartItem in chart){
connectivity metric.list;
connectivityMetric.inbound=get(inbound links);
connectivityMetric.outbound=get(outbound links);
connectivityMetric.total=connectivityMetric.outbound+
connectivityMetric.inbound;
return connectivityMetric;
}
foreach (chartItem in chart){
rankByConnectivityMetric(chartItem.connectivityMetric.total);}
}
```

The connectivity metric may be a numerical ranking based on the total number of inbound and outbound links to, or between, each of the elements. This may be implemented for each of the elements in the initial chart, or may be focused only on the chart elements which are close to the edge between charts output charts. In this manner, the system may save additional resources by partitioning first by location, and then "tie-breaking" utilizing the connectivity metric.

The chart-parser may add the chart elements which are most connected to one another to a list. The final graphical chart size may be defined by the user or from another input. In one embodiment, the final graphical chart size may be based off of an output format such as an output for printing to an 8.5"×11" piece of paper.

define var finalGraphicalChartSize=selectedOutputSize( );

In one embodiment, the chart scaler determines the minimum display size that a graphical chart must be for the selected graphical chart elements to fit on the graphical chart.

```
Chart scaler(chart){
forEach(chartItem in chart){
itemDimensions=findChartItemWidthHeightSpacing
  (chartItem);
initialGraphicalChartSize.width+=itemDimensions.x;
initialGraphicalChartSize.height+=itemDimensions.y;
}
minimum display size=initialGraphicalChartSize;
return minimumSize;
}
```

In one embodiment, the estimator calculates the number of graphical charts of final graphical chart size that will be necessary to capture the elements contained on the initial canvas.

```
Estimator(xWidth, yHeight){
graphicalChartXNumber=roundUpToInteger(finalGraphicalChartSize.width/xWidth);
graphicalChartYNumber=roundUpToInteger(finalGraphicalChartSize.height/yHeight);
if (graphicalChartXNumber>=graphicalChartYNumber){
numberOfGraphicalCharts=graphicalChartXNumber;
}else{
numberOfGraphicalCharts=graphicalChartYNumber;
}
}
```

The geometric locator may find the location of the object based on a point on the object, in one embodiment this may be the top left corner of the object. Based on this, this method finds the location on both axes (in one embodiment, the X and Y axes), giving it the first axis geometric location value and second axis geometric location value for the object.

```
geometricLocator(chart){//geometric geometric locator
forEach(chartItem in chart){
findXYCoord( );
return XYCoord;
}
}
```

In one embodiment, the partitioner is configured with the location values for the first, second, third and fourth chart elements (using the and the connectivity metric. The partitioner may first group the elements by the location of the element then by each elements connectivity to the other elements. Then, breaks the groups depending on which elements are most interconnected with other elements. This breaks up the charts in a place which is the most efficient based on the location of the chart and the connectivity of the chart.

```
Partitioner(firstChartElement,      secondChartElement,
thirdChartElement, fourthChartElement){
    groupByLocation(firstChartElement.locationValue, sec-
ondChartElement.locationValue,  thirdChartElement.loca-
tionValue, fourthChartElement.locationValue);
    groupByConnectivity(firstChartElement.connectivity-
Metric,   secondChartElement.connectivityMetric,   third-
ChartElement.connectivityMetric, fourthChartElement.con-
nectivityMetric);
    firstTree=createTree(firstChartElement, secondChartEle-
ment);
    secondTree=createTree(thirdChartElement,      fourth-
ChartElement);
    return firstTree, secondTree;
}
```

In one embodiment, the mapper maps the first tree and the second tree to a designated graphical chart, in one embodiment, this may be designated by the spatial relationship between graphical chart elements or the size of the graphical charts or trees.

```
Mapper(firstTree, secondTree){
    getLocationValue(firstTree);
    getLocationValue(secondTree);
    firstTree.mapTo(firstGraphicalChart);
    secondTree.mapTo(secondGraphicalChart);
}
```

FindAttachment between first tree and second trees using connectivity metric and generate first and second graphical links and attach the first and second graphical links to their respective graphical charts.

```
graphicalChartCoupler(firstGraphicalChart,     second-
GraphicalChart, firstTree, secondTree){
    firstGraphicalLinkElement.attachTo(firstGraphical-
Chart);
    secondGraphicalLinkElement.attachTo(secondGraphical-
Chart);
}
```

In some embodiments, a method for partitioning graphical charts may include providing a group of linked chart elements on a graphical chart, configuring a chart scaler to calculate an initial graphical chart size based on a minimum display size for the group of linked chart elements. Defining a final graphical chart size; an estimator calculating the number of graphical charts of the final graphical chart size needed to encompass the initial graphical chart size; configuring a graphical chart generator to create a first graphical chart and a second graphical chart; generating a first chart element location value by applying a geometric locator to the first chart element. Generating a second chart element location value by applying the geometric locator to the second chart element. Generating a third chart element location value by applying the geometric locator to the third chart element. Generating a fourth chart element location value by applying the geometric locator to the fourth chart element. Configuring a chart-parser with the group of linked chart elements to generate a connectivity metric to group the group of linked chart elements according to the number of links between the group of linked chart elements. In one embodiment configuring a partitioner with the first chart element location value, the second chart element location value, the third chart element location value, the fourth chart element location value, and the connectivity metric to group the first chart element and the second chart element into a first tree and group the third chart element and the fourth chart element into a second tree. In one embodiment, configure a mapper with the first tree and the second tree to map the first tree to the first graphical chart and the second tree to the second graphical chart; and/or configuring a graphical chart coupler to generate a first graphical link element on the first graphical chart and a second graphical link element on the second graphical chart.

In some embodiments, the providing a group of linked chart elements may include a first chart element, a second chart element, a third chart element, and a fourth chart element.

In some embodiments, providing a graphical chart may include the group of linked chart elements on a graphical user interface.

In some embodiments, generating a first chart element location value by applying to the first chart element, a geometric locator may include calculating a first axis geometric location value and/or calculating a second axis geometric location value.

In some embodiments, the graphical chart is partitioned in response to an action performed on the graphical user interface.

In some embodiments, the connectivity metric may include data describing links between chart elements and any directions of the links.

In some embodiments, the first graphical link element on the first graphical chart links to the second graphical link element on the second graphical chart.

DRAWINGS

The system for partitioning graphical charts 100 comprises a parent graphical chart 136, a first chart element 104, a second chart element 106, a third chart element 108, a fourth chart element 110, a chart scaler 112, an estimator 114, a graphical chart generator 116, a first child graphical chart 118, a second child graphical chart 120, a geometric locator 122, a chart parser 124, a partitioner 126, a mapper 128, a graphical chart coupler 130, a first tree 132, and a second tree 134.

The first tree 132 further comprises the first chart element 104 and the second chart element 106.

The second tree 134 further comprises the fourth chart element 110 and the third chart element 108.

FIG. 1 illustrates an embodiment of a system for partitioning graphical charts 100.

Figure 2:
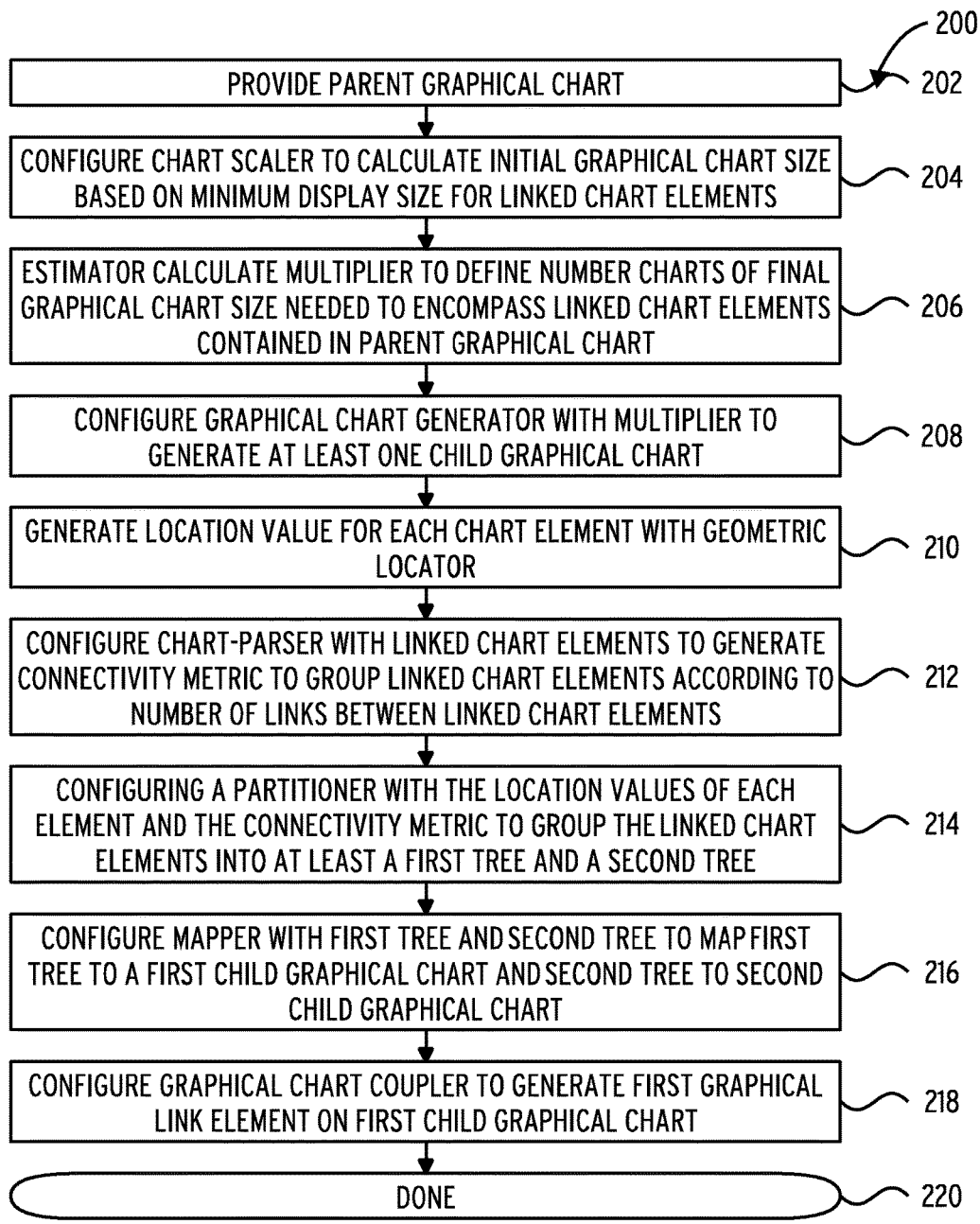
FIG. 2 illustrates an embodiment of a process for partitioning graphical charts 200.

The system for partitioning graphical charts 100 may be operated in accordance with the processes described in FIG. 2.

The parent graphical chart 402 on the graphical user interface 102 displays the parent graphical chart 402 comprised of the linked chart elements: first chart element 104, second chart element 106, third chart element 108, and fourth chart element 110. The chart parser 124 receives the linked chart elements and calculates a connectivity metric based on the interconnectedness of the chart elements. The geometric locator 122 receives the location coordinates corresponding to the different chart elements and location value for each element. The chart scaler 112 calculates the minimum size for the parent graphical chart 402 and the estimator 114 calculates a multiplier specifying the number of graphical charts of a final graphical chart size needed to display the elements. The graphical chart generator 116 receives the multiplier and generates the number of child charts specified, the first child graphical chart 118 and the second child graphical chart 120. The partitioner 126 partitions the chart elements into multiple trees based on the connectivity metric and element location values, splitting the chart elements into a first tree 132 and a second tree 134. The mapper maps the first tree 132 to the first child graphical chart 118 and the second tree 134 to the second child graphical chart 120. The graphical chart coupler 130 inserts a first graphical link element into the first child graphical chart 118 to connect it to the second child graphical chart 120 and a second graphical link element onto the second child graphical chart 120 to connect it to the first child graphical chart 118.

FIG. 2 illustrates an embodiment of a process for partitioning graphical charts 200.

In block 202, process for partitioning graphical charts 200 provides a parent graphical chart. In block 204, process for partitioning graphical charts 200 configures a chart scaler to calculate an initial graphical chart size based on a minimum display size for the linked chart elements. In block 206, process for partitioning graphical charts 200 estimator calculates a multiplier to define the number charts of a final graphical chart size needed to encompass the linked chart elements contained in the parent graphical chart. In block 208, process for partitioning graphical charts 200 configures a graphical chart generator with the multiplier to generate at least one child graphical chart. In block 210, process for partitioning graphical charts 200 generates a location value for each chart element with a geometric locator. In block 212, process for partitioning graphical charts 200 configures a chart-parser with the linked chart elements to generate a connectivity metric to group the linked chart elements according to the number of links between the linked chart elements. In block 214, process for partitioning graphical charts 200 configuring a partitioner with the location values of each element and the connectivity metric to group the linked chart elements into at least a first tree and a second tree. In block 216, process for partitioning graphical charts 200 configures a mapper with the first tree. In block 218, process for partitioning graphical charts 200 configures a graphical chart coupler to generate a first graphical link element on the first child graphical chart. In done block 220, process for partitioning graphical charts 200 ends.

The process for partitioning graphical charts 200 improves the efficiency of the machine itself by reducing the number of human-machine interactions. By automatically determining the most likely point of partition, the graphical user interface may be reconfigured and rendered once without the need for generating intervening interfaces to determine the proper configuration and partition point.

A method for partitioning graphical charts may include providing a parent graphical chart, configuring a chart scaler to calculate an initial graphical chart size based on a minimum display size for the linked chart elements, an estimator calculating a multiplier to define the number charts of a final graphical chart size needed to encompass the linked chart elements contained in the parent graphical chart. A graphical chart generator may be configured with the multiplier to generate at least one child graphical chart. The method may include generating a location value for each chart element with a geometric locator, configuring a chart-parser with the linked chart elements to generate a connectivity metric to group the linked chart elements according to the number of links between the linked chart elements, configuring a partitioner with the location values of each element and the connectivity metric to group the linked chart elements into at least a first tree and a second tree, configuring a mapper with the first tree and the second tree to map the first tree to a first child graphical chart and the second tree to the second child graphical chart, and/or configuring a graphical chart coupler to generate a first graphical link element on the first child graphical chart and a second graphical link element on the second child graphical chart.

Providing a parent graphical chart may include a group of linked chart elements on a graphical user interface.

The generating a location value for each chart element with a geometric locator may include calculating a set of location coordinates. The parent graphical chart may be partitioned in response to an action performed on the graphical user interface. The connectivity metric may include data describing links between chart elements and any direction of the links.

The first graphical link element on the first child graphical chart links to the second graphical link element on the second child graphical chart. The minimum display size for the linked chart elements may be calculated utilizing the contents of the linked chart elements.

Generating the connectivity metric may further include calculating the number of links between chart elements. The final graphical chart size may be user defined. Further, calculating the location coordinates may further include calculating the chart element's location relative to a first and second axis. The partitioner may be additionally configured with the multiplier to determine the number of partitions to create in the chart.

Figure 3:
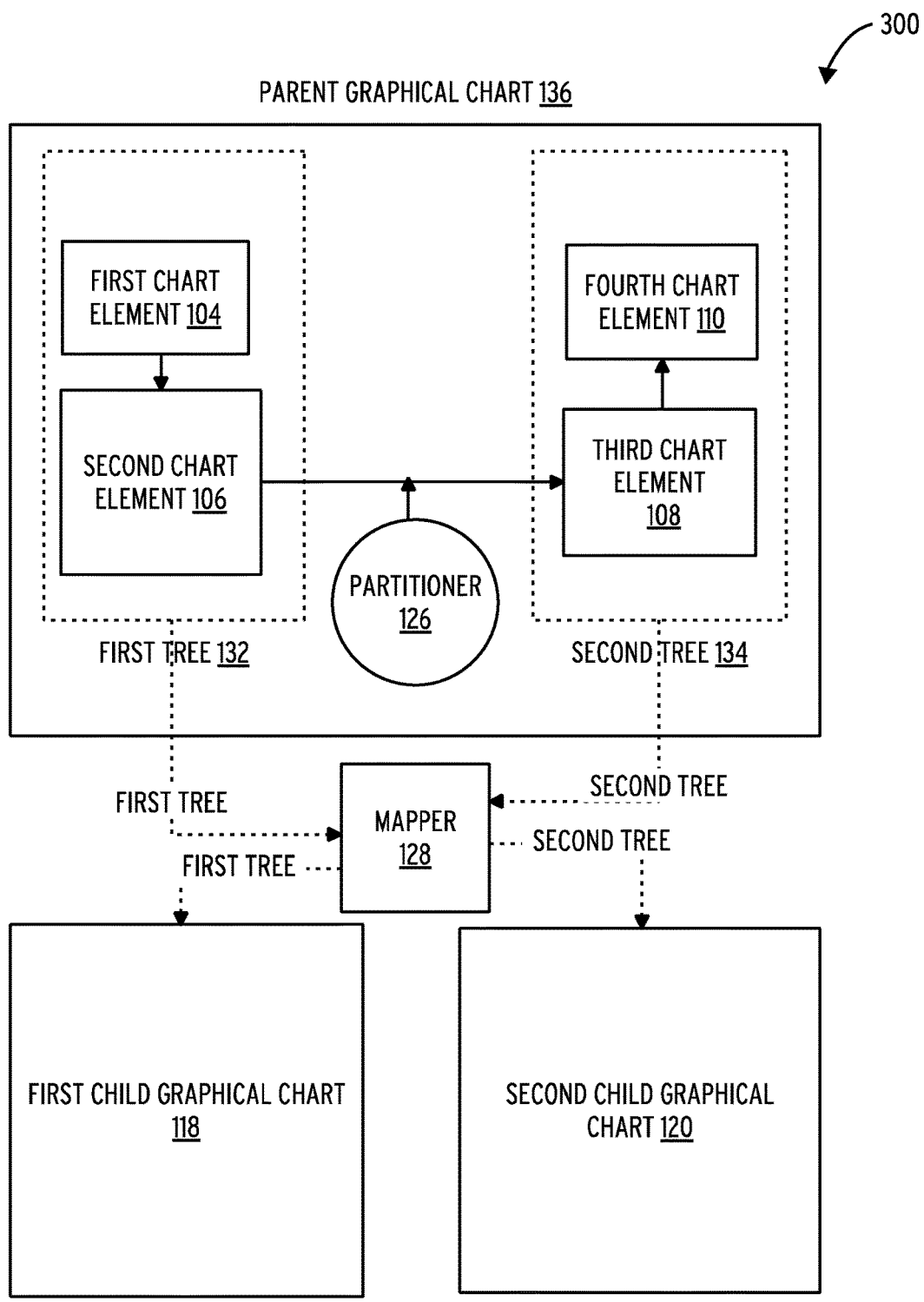
FIG. 3 illustrates an embodiment of a system for partitioning and mapping chart elements to multiple canvases 300.

FIG. 3 illustrates an embodiment of a system for partitioning and mapping chart elements to multiple canvases 300.

The system for partitioning and mapping chart elements to multiple canvases 300 comprises first chart element 104, second chart element 106, fourth chart element 110, third chart element 108, parent graphical chart 136, partitioner 126, parent graphical chart 402, first tree 132, mapper 128, first chart element 104, and second child graphical chart 120. The system for partitioning and mapping chart elements to multiple canvases 300 may be operated in accordance with the processes described in FIG. 2.

The partitioner 126 partitions the parent graphical chart 136 into the first tree 132 comprising the first chart element 104 and the second chart element 106 and the second tree 134 comprising the third chart element 108 and the fourth chart element 110. The mapper 128 maps the first tree 132 to the first child graphical chart 118 and the second tree 134 to the second child graphical chart 120.

Figure 4:
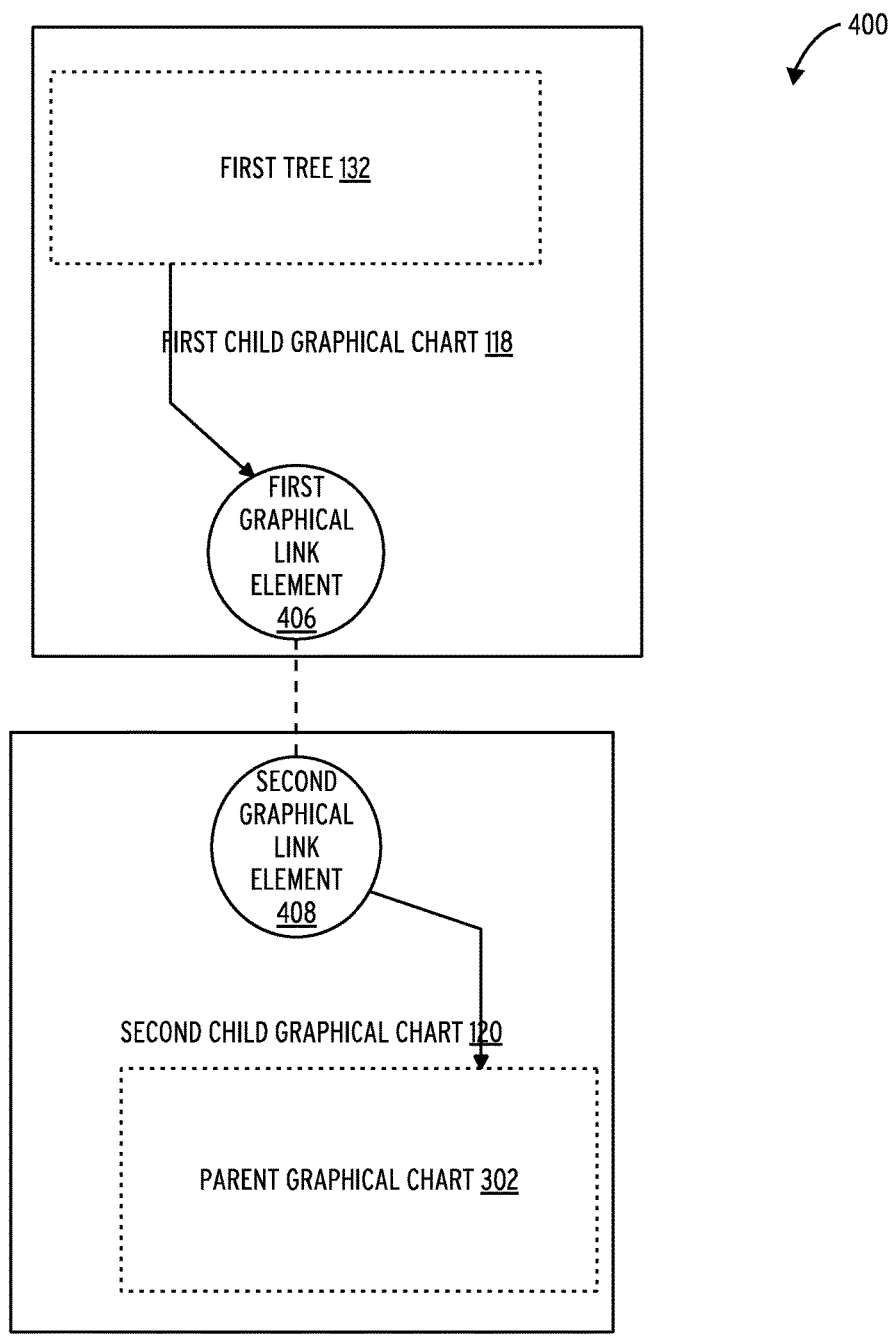
FIG. 4 illustrates an embodiment of a system establishing graphical link elements on graphical charts 400.

FIG. 4 illustrates an embodiment of a system establishing graphical link elements on graphical charts 400.

The system establishing graphical link elements on graphical charts 400 comprises first tree 132, first child graphical chart 118, first graphical link element 406, second graphical link element 408, second child graphical chart 120, and parent graphical chart 402.

The first tree 132 of the first child graphical chart 118 is linked to the first graphical link element 406 the first graphical link element 406 is linked to the parent graphical chart 402 on the second child graphical chart 120 via the second graphical link element 408.

The system establishing graphical link elements on graphical charts 400 may be operated in accordance with the processes described in FIG. 2.

Figure 5:
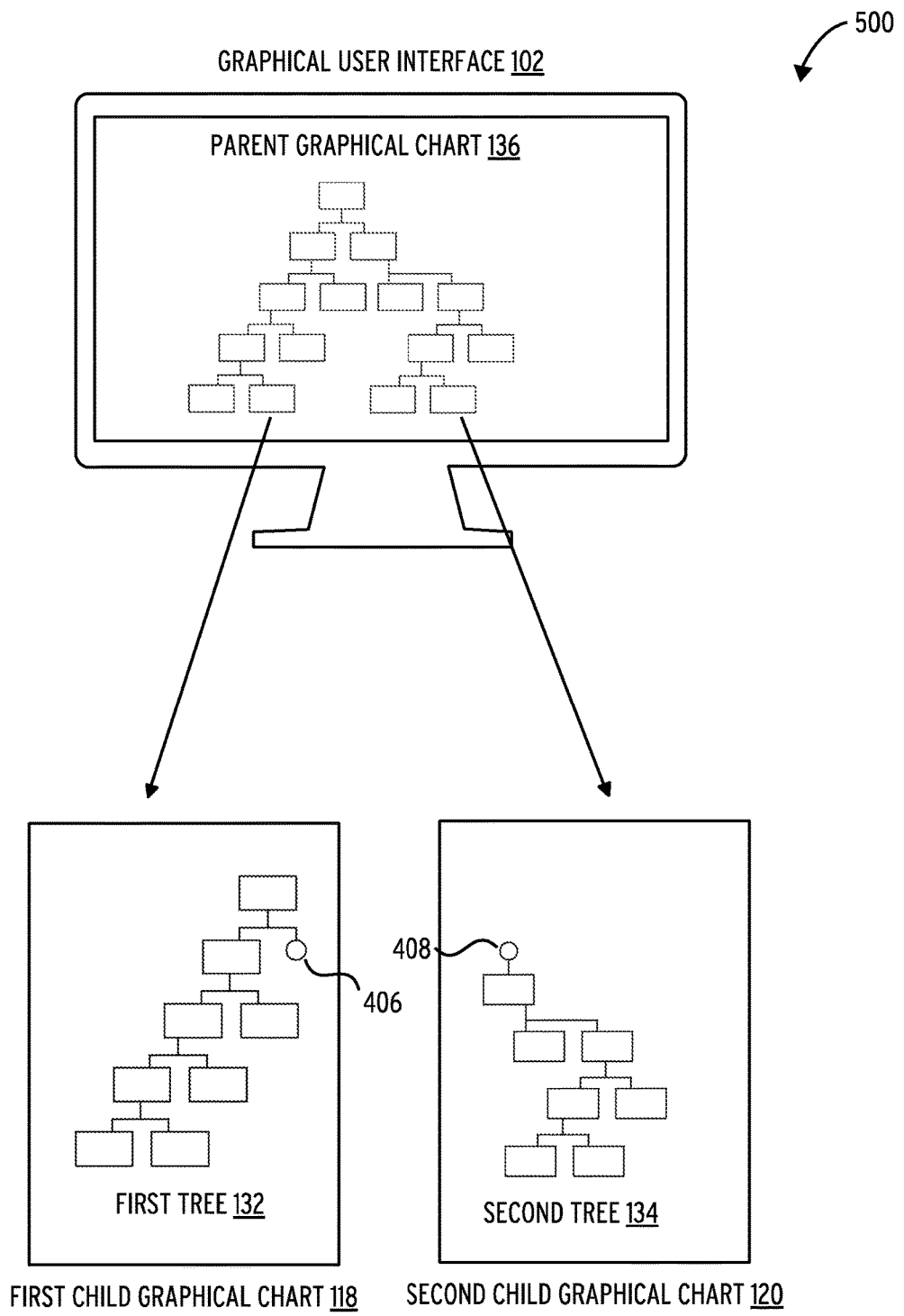
FIG. 5 illustrates an embodiment of a system establishing graphical link elements on graphical charts 500.

FIG. 5 illustrates an embodiment of a system establishing graphical link elements on graphical charts 500.

The system establishing graphical link elements on graphical charts 500 comprises a first child graphical chart 118, a second child graphical chart 120, a first tree 132, a parent graphical chart 402, a parent graphical chart 136, a first graphical link element 406, a second graphical link element 408, and a graphical user interface 102.

The parent graphical chart 136 is split into the first child graphical chart 118 and the second child graphical chart 120. The first graphical link element 406 and the second graphical link element 408 provide a link between first child graphical chart 118 and the second child graphical chart 120.

Figure 6:
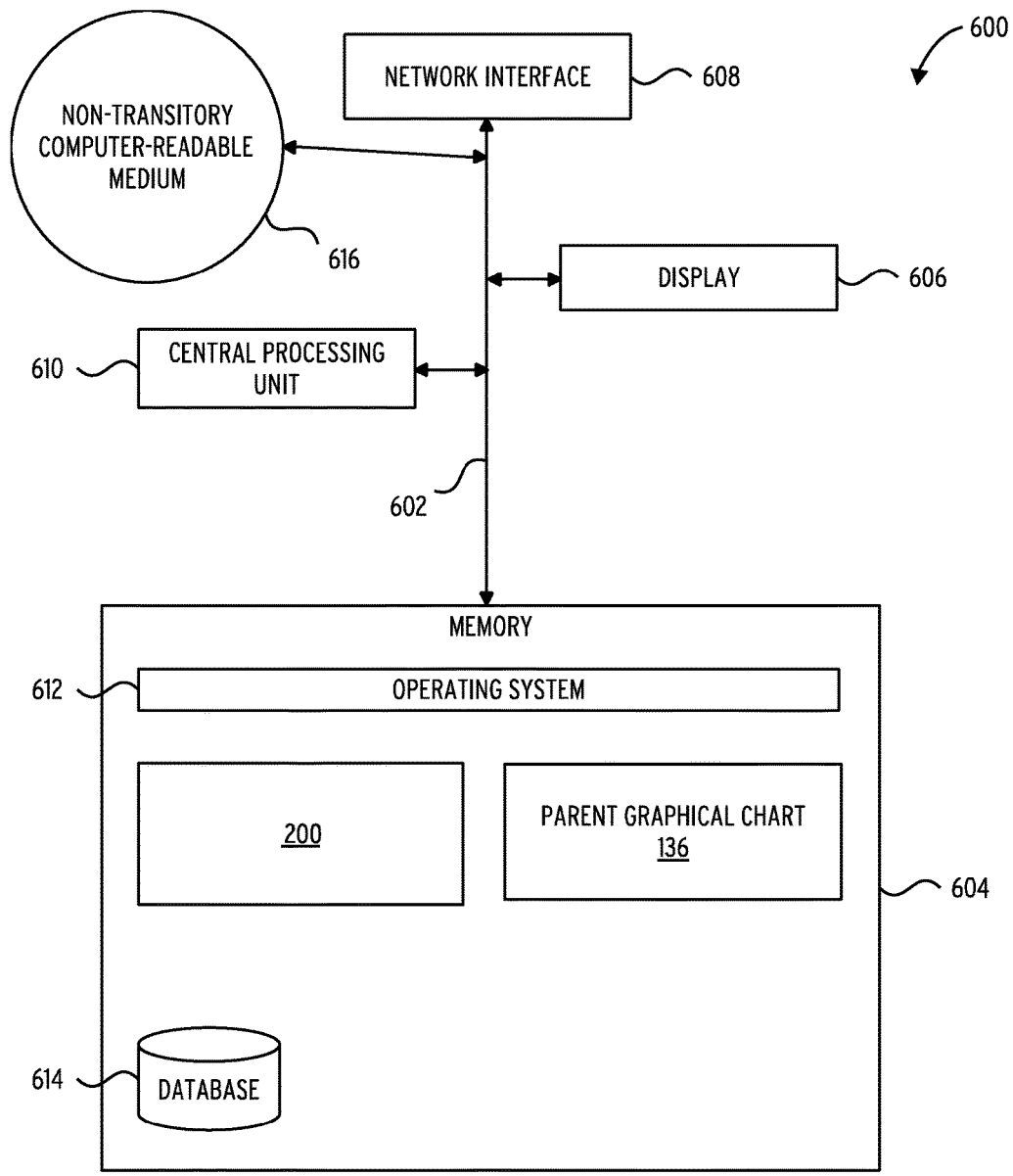
FIG. 6 illustrates a server 500 in accordance with one embodiment.

FIG. 6 illustrates several components of an exemplary server 600 in accordance with one embodiment. In various embodiments, server 600 may include a desktop PC, server, workstation, mobile phone, laptop, tablet, set-top box, appliance, or other computing device that is capable of performing operations such as those described herein. In some embodiments, server 600 may include many more components than those shown in FIG. 6. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, server 600 may comprise one or more physical and/or logical devices that collectively provide the functionalities described herein. In some embodiments, server 600 may comprise one or more replicated and/or distributed physical or logical devices.

In some embodiments, server 600 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Server 600 includes a bus 602 interconnecting several components including a network interface 608, a display 606, a central processing unit 610, and a memory 604.

Memory 604 generally comprises a random access memory ("RAM") and permanent non-transitory mass storage device, such as a hard disk drive or solid-state drive. Memory 604 stores an operating system 612.

These and other software components may be loaded into memory 604 of server 600 using a drive mechanism (not shown) associated with a non-transitory computer-readable medium 616, such as a floppy disc, tape, DVD/CD-ROM drive, memory card, or the like.

Memory 604 also includes database 614. In some embodiments, server 200 (deleted) may communicate with database 614 via network interface 608, a storage area network ("SAN"), a high-speed serial bus, and/or via the other suitable communication technology.

In some embodiments, database 614 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

What is claimed is:

1. A method for partitioning graphical charts comprising:
providing a parent graphical chart comprising a plurality of linked chart elements on a graphical user interface;
configuring a chart scaler to calculate an initial graphical chart size based on a minimum display size for the linked chart elements;
an estimator calculating a multiplier to define the number charts of a final graphical chart size needed to encompass the linked chart elements contained in the parent graphical chart;
configuring a graphical chart generator with the multiplier to generate at least one child graphical chart;
generating a location value for each chart element with a geometric locator comprising: calculating a set of location coordinates;
configuring a chart-parser with the linked chart elements to generate a connectivity metric to group the linked chart elements according to the number of links between the linked chart elements;
configuring a partitioner with the location values of each element and the connectivity metric to group the linked chart elements into at least a first tree and a second tree;
configuring a mapper with the first tree and the second tree to map the first tree to a first child graphical chart and the second tree to the second child graphical chart; and
configuring a graphical chart coupler to generate a first graphical link element on the first child graphical chart and a second graphical link element on the second child graphical chart.

2. The method of claim 1, wherein the parent graphical chart is partitioned in response to an action performed on the graphical user interface.

3. The method of claim 1, wherein the connectivity metric comprises data describing links between chart elements and any direction of the links.

4. The method of claim 1, wherein the first graphical link element on the first child graphical chart links to the second graphical link element on the second child graphical chart.

5. The method of claim 1, wherein the minimum display size for the linked chart elements may be calculated utilizing the contents of the linked chart elements.

6. The method of claim 1, wherein generating the connectivity metric further comprises: calculating the number of links between chart elements.

7. The method of claim 1, wherein the final graphical chart size is user defined.

8. The method of claim 1, wherein calculating the location coordinates further comprises calculating the chart element's location relative to a first and second axis.

9. The method of claim 1, wherein the partitioner is additionally configured with the multiplier to determine the number of partitions to create in the chart.

10. A computing apparatus for partitioning graphical charts, the computing apparatus comprising:
a processor; and
a memory storing instructions that, when executed by the processor, configure the apparatus to:
provide a parent graphical chart comprising a plurality of linked chart elements on a graphical user interface;
configure a chart scaler to calculate an initial graphical chart size based on a minimum display size for the linked chart elements;
an estimator calculating a multiplier to define the number charts of a final graphical chart size needed to encompass the linked chart elements contained in the parent graphical chart;
configure a graphical chart generator with the multiplier to generate at least one child graphical chart;
generate a location value for each chart element with a geometric locator comprising: calculating a set of location coordinates;
configure a chart-parser with the linked chart elements to generate a connectivity metric to group the linked chart elements according to the number of links between the linked chart elements;
configure a partitioner with the location values of each element and the connectivity metric to group the linked chart elements into at least a first tree and a second tree;
configure a mapper with the first tree and the second tree to map the first tree to a first child graphical chart and the second tree to the second child graphical chart; and
configure a graphical chart coupler to generate a first graphical link element on the first child graphical chart and a second graphical link element on the second child graphical chart.

11. The computing apparatus of claim 10, wherein the parent graphical chart is partitioned in response to an action performed on the graphical user interface.

12. The computing apparatus of claim 10, wherein the connectivity metric comprises data describe links between chart elements and any direction of the links.

13. The computing apparatus of claim 10, wherein the first graphical link element on the first child graphical chart links to the second graphical link element on the second child graphical chart.

14. The computing apparatus of claim 10, wherein the minimum display size for the linked chart elements may be calculated utilize the contents of the linked chart elements.

15. The computing apparatus of claim 10, wherein generating the connectivity metric further comprises: calculate the number of links between chart elements.

16. The computing apparatus of claim 10, wherein the final graphical chart size is user defined.

17. The computing apparatus of claim 10, wherein calculate the location coordinates further comprises calculating the chart element's location relative to a first and second axis.

18. The computing apparatus of claim 10, wherein the partitioner is additionally configured with the multiplier to determine the number of partitions to create in the chart.

19. A non-transitory computer-readable storage medium for partitioning graphical charts, the computer-readable storage medium including instructions that when executed by a computer, cause the computer to:
provide a parent graphical chart comprising a plurality of linked chart elements on a graphical user interface;
configure a chart scaler to calculate an initial graphical chart size based on a minimum display size for the linked chart elements;
an estimator calculating a multiplier to define the number charts of a final graphical chart size needed to encompass the linked chart elements contained in the parent graphical chart;
configure a graphical chart generator with the multiplier to generate at least one child graphical chart;

generate a location value for each chart element with a geometric locator comprising: calculating a set of location coordinates;

configure a chart-parser with the linked chart elements to generate a connectivity metric to group the linked chart elements according to the number of links between the linked chart elements;

configure a partitioner with the location values of each element and the connectivity metric to group the linked chart elements into at least a first tree and a second tree;

configure a mapper with the first tree and the second tree to map the first tree to a first child graphical chart and the second tree to the second child graphical chart; and configure a graphical chart coupler to generate a first graphical link element on the first child graphical chart and a second graphical link element on the second child graphical chart.

20. The computer-readable storage medium of claim 19, wherein the parent graphical chart is partitioned in response to an action performed on the graphical user interface.

21. The computer-readable storage medium of claim 19, wherein the connectivity metric comprises data describe links between chart elements and any direction of the links.

22. The computer-readable storage medium of claim 19, wherein the first graphical link element on the first child graphical chart links to the second graphical link element on the second child graphical chart.

23. The computer-readable storage medium of claim 19, wherein the minimum display size for the linked chart elements may be calculated utilize the contents of the linked chart elements.

24. The computer-readable storage medium of claim 19, wherein generating the connectivity metric further comprises: calculate the number of links between chart elements.

25. The computer-readable storage medium of claim 19, wherein the final graphical chart size is user defined.

26. The computer-readable storage medium of claim 19, wherein calculate the location coordinates further comprises calculating the chart element's location relative to a first and second axis.

27. The computer-readable storage medium of claim 19, wherein the partitioner is additionally configured with the multiplier to determine the number of partitions to create in the chart.

* * * * *